Patented Apr. 24, 1945

2,374,354

UNITED STATES PATENT OFFICE 2,374,354

IMIDAZOLINES

Saul Kaplan, Rutherford, N. J., assignor to The Richards Chemical Works, Jersey City, N. J., a corporation of New Jersey No Drawing. Application January 13, 1942,
Serial No. 426,560

17 Claims. (Cl. 260—309.6)

This invention relates to new imidazoline derivatives and it provides new polymerized amino di-imidazolines and acylated amino di-imidazolines as well as a new process by which such polymers may be produced.

Imidazolines are compounds containing an imidazoline ring which may be represented as follows:

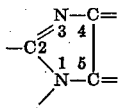

Di-imidazolines are compounds containing two such ring structures.

The particular di-imdazolines with which this invention is concerned may be represented by the following formula:

in which R is a residue selected from the group consisting of aliphatic and aromatic residues, X is an imidazoline radical which is linked to R at the 2 position of the imidazoline radical and Y is a radical selected from the group consisting of alkyl amine and polyalkylene polyamine groups, Y being linked to the nitrogen in the 1-position of the imidazoline radical. In accordance with the process of this invention such compounds are polymerized to produce new polymerization products by reacting them with a bifunctional condensing agent. New acylated polymerization products may be produced in accordance with the invention by acylating compounds having the formula set forth above before reacting them with a bifunctional condensing agent. The new acylated polymers may also be produced in accordance with the invention by polymerizing the amino di-imidazoline and then acylating the resulting polymer.

The new product may be in the form of free bases or in the form of salts which may be produced by acidifying the free bases. In general, the new products are solids of a soft resinous, hygroscopic nature, although the character of the product will vary depending among other factors upon the degree of polymerization which it has undergone. The new products are advantageously used in the form of aqueous solution of their salts. Such solutions are advantageously prepared in accordance with the invention by treating the polymerization product in the liquid state with an aqueous acid solution.

The new polymerized amino di-imidazoline derivatives of this invention in the form of free bases or their salts are useful as cationic softening agents and as flotation and emulsifying agents. They are effective agents for fixing direct dyes so that they are fast to the action of water. The compounds of this invention in the form of bases or their salts are also useful as assistants in the stripping of vat dye stuffs. They may also be used in the breaking of crude oil emulsions. In the form of free bases the new compounds are useful as intermediates in the preparation of germicides, fungicides and moth-proofing agents.

The amino di-imidazoline derivatives which are subjected to polymerization in accordance with the process of this invention may advantageously be prepared by reacting a polyalkylene polyamine with a di-basic carboxylic acid. Among the polyalkylene polyamines which may be used with advantage are diethylene triamine, triethylene tetramine, tetraethylene pentamine, dipropyline triamine, tripropylene pentamine, tetrapropylene pentamine, or a mixture of these amines, as the 1, 2-polyamines, etc.

The di-basic carboxylic acid which is used in preparing the amino di-imidazoline should be one which does not form imides when heated with primary or secondary amines, nor should the acid decompose when heated by itself to a temperature of about 180° C. Furthermore, it is desirable to avoid the use of acids which contain conjugated double bonds in the enol or keto form. It is also desirable that the acid contain no other reactive group than the carboxylic group. The di-basic carboxylic acids may be either aliphatic or aromatic acids. Among the aliphatic acids which may be used with advantage are adipic, suberic and sebacic acids and their homologues and substitution products. Suitable aromatic acids include phenylene di-acetic, terephthalic, 1, 4- or 1, 5- or 1, 6-naphthalene di-carboxylic acids, etc. The dibasic carboxylic acids may have the carbon chain interrupted by one or more oxygen or sulfur atoms, such groups being unreactive when carrying out the procedure of this invention. Examples of such acids are di-carboxyl ethyl ether, $O(CH_2CH_2COOH)_2$, hydroquinone p-diglycol ether acid, and the like.

The amino di-imidazolines are advantageously prepared by heating the di-basic acid, either in the form of the free acid or as the acid anhydride or acid halide, with the free amine in the ratio of about 2 to 4 mols of the amine per mole of carboxyl group in the acid at temperatures of about 150° to 250° C. The reaction may be carried out in an apparatus supplied with a stirrer and designed to condense and separate from the reaction mixture the water formed by the reaction, or, when an ester is employed, to separate the alcohol and water formed by the reaction. It is advantageous to use an inert solvent such as toluol or xylol to facilitate the removal of the water from the reaction mixture. After the reaction is substantially complete as evidenced by the cessation of the evolution of water, usually from 20 to 60 hours depending upon the temperature, the inert solvent and the excess amine are recovered by distillation at reduced pressure.

In preparing the compounds just described it is advantageous to use a substantial excess of the amine in order to minimize the formation of linear polymers by the reaction of 2 molecules of the acid with 2 primary amine groups in the polyamine.

Alternatively, the salts of the di-imidazolines may be formed by reacting the dibasic acid with a mixture of the amine and amine hydrochloride. The reaction takes place more quickly than the one in previous examples, but for the purpose of polymerization and acylation, it is advantageous to first isolate the free base. This may be done by adding sufficient alkali to an aqueous solution of the di-imidazoline and extracting the free base with a solvent, such as ether or benzene.

In preparing the new polymers of this invention the amino di-imidazoline is reacted with a bifunctional condensing agent which is capable of reacting with primary or secondary amino groups. The bifunctional condensing agents, because they contain 2 reactive groups, serve to link together 2 or more molecules of the amino di-imidazoline to bring about the formation of the new polymerization products. The bifunctional condensing agents may be either aromatic or aliphatic compounds containing such reactive groups as for example carboxyl or halogen groups including chlorine, bromine or iodine. It is, of course, manifest that in order for the material to serve as a bifunctional condensing agent it must have these groups present in the form in which they are reactive. Thus it is well known that the chlorine attached to a vinyl linkage, e. g. —CH=CHCl, is unreactive and a compound containing such a chlorine in one position and another halogen in some other position in the molecule would not be suitable as a bifunctional condensing agent unless it also contained some other reactive group.

Among the bifunctional condensing agents which may be used with advantage are alkylene di-halides such as ethylene di-bromide or propylene di-chloride; halides of carbonic acid esters such as ethyl chlorocarbonate; carbonylhalides, such as phosgene; carbonic acid esters such as ethyl carbonate; alpha substituted halogen carboxylic acids such as chloroacetic acid; and dibasic aliphatic or aromatic acids such as terephthalic or sebacic acids. Among the aromatic bifunctional condensing agents which may be used with advantage are xylylene di-halides, benzyl chloride carboxylic acid and the like. The carboxyl group may be present in any of the bifunctional condensing agents in the form of its ester anhydride or acyl halide.

If it is desired to produce polymerization products which are not too difficultly soluble or insoluble in water when neutralized, the reaction should be controlled so as not to produce a too highly polymerized product. In general such a more or less limited polymerization may be accomplished by linking from 2 to 5 of the amino di-imidazoline molecules. The solubility of the product in water will also, of course, depend upon the particular amino di-imidazoline which is being polymerized. In general, an amino di-imidazoline containing a relatively large proportion of hydrophilic groups may be subjected to a greater degree of polymerization than one containing a smaller proportion of such groups, if the same degree of water solubility is to be a characteristic of the ultimate product. An amino di-imidazoline such as octamethylene bis-2-(1-aminoethyl-imidazoline) should not be subjected to as high a degree of polymerization as a compound such as tetramethylene bis-2-(1-aminoethylimidazoline) if the same degree of water solubility of the final product is to be achieved. Similarly the character of the condensing agent will also affect the water solubility of the final product. Thus, other things being equal, the number of moles of a bifunctional condensing agent such as ethyl chlorocarbonate employed to bring about polymerization should be smaller than the number of moles of an agent such as propylene di-chloride if the same degree of water solubility is to be achieved. The former compound results in the production of a substituted urea derivative which may be considered to have less than 1 hydrophilic group per carbonyl, whereas the propylene di-chloride yields a substituted secondary diamine which contains 2 strongly active hydrophilic groups per alkylene group. Other factors which must be considered in controlling the degree of water solubility of the final product include the number of carbon atoms in the bifunctional condensing agent as well as the number of carbon atoms in the amino di-imidazoline which is subjected to polymerization.

In producing acylated polymerization products in accordance with this invention, the amino di-imidazoline is reacted with a mono or di-carboxylic acid or their derivatives in the form of halides, anhydrides or esters. The carboxylic acids may be aliphatic, aromatic, heterocyclic or alicyclic, and may advantageously include such acids as for example acetic, lauric, petroleum naphthenic acids, pyridine-carboxylic acids or mixtures of acids such as are found in cocoanut oil. In general the degree to which the amino di-imidazoline derivatives are acylated should be somewhat less than is necessary to acylate the primary amino groups in the amino di-imidazoline if the amino di-imidazoline contains no secondary amino groups, since some of these should be left free for polymerization. Amino di-imidazolines containing both primary and secondary amino groups may have all of the primary amino groups acylated leaving the secondary amino groups free for polymerization. Thus a compound such as hexamethylene bis-2-(1-aminoethylimidazoline) may be acylated at one primary nitrogen and then 2 molecules of the resulting product may be linked together at the remaining primary nitrogen by means of a bifunctional condensing agent such as propylene di-chloride to produce a dimeric compound. To produce acylated trimers or tetramers of the same amino di-imidazoline, ⅔ of a mole and ½ a mole respectively of the acylating agent should be used per mole of the di-imidazoline. However, if the amino di-imidazoline contains secondary amino groups as would be the case in compounds prepared from such polyalkylene amines as trialkylene tetramines or tetralkylene pentamines, the primary amino groups may be fully acylated and the subsequent polymerization step may be performed on the secondary amino groups.

The acylated polymerization products may also be prepared in accordance with this invention by polymerizing the amino di-imidazoline and then acylating the resulting product.

The water solubility of the polymerized acylated derivatives is affected not only by the degree of acylation but also by the character of the compounds used to bring about the acylation. To produce water soluble products a proper balance must be achieved between the hydrophobic and hydrophilic portions of the molecule. In general the hydrophobic portion of the molecule consists of the residues of the acylating compound, the bifunctional condensing agent and the dibasic acid used in forming the di-imidazoline. The hydrophilic portion of the compound usually consists of the imidazoline ring and the primary, secondary and tertiary amino groups. In general to produce a product having a suitable water solubility it is advantageous to have no more than about 18 carbon atoms in the hydrophobic portion, per hydrophilic group, although this will, of course, be affected by the type of hydrophobic group in association therewith. Thus for example a benzene ring generally will have a slightly lesser hydrophobic effect than a normal hexyl radical, and a branched hydrocarbon chain somewhat less than a straight hydrocarbon chain. In some applications such as in the fixing of direct dyes to water it is advantageous to use from 2 to 10 carbon atoms per hydrophilic group.

The amount of bifunctional condensing agent used in effecting the polymerization of the amino di-imidazolines is less than that required to react with all the amino groups present in the di-imidazoline. In cases where an alkylene halide or alpha halogen acid or the like is used as the condensing agent a number of the amino groups will be present in the final product as the hydrohalide. Even with such condensing agents, however, the final product will have some free amino groups, usually secondary or tertiary groups, although primary amine groups may also be present.

The polymerization products, both acylated and unacylated, produced in accordance with this invention may be used in the form of their free bases, or in the form of their salts. Such salts may be formed by treating the bases with inorganic acids such as, for example, hydrochloric or sulfuric acids, or organic acids such as, for example, benzoic, acetic, formic, phthalic or glycollic acids. Advantageously the acids are in the form of aqueous solutions which are reacted with the bases while the latter are in a liquid state. The new products, either as free bases or their salts, are advantageously used in the form of aqueous solutions which may be produced by this procedure.

The preparation of amino di-imidazolines suitable for polymerization, or acylation and polymerization, in accordance with the process of this invention will be illustrated by the following examples in which the preparation of amino di-imidazolines from aliphatic and aromatic dibasic carboxylic acids will be described.

*Example 1.—Octamethylene bis-2-(1-aminoethylimidazoline)*

About 202 parts of sebacic acid (1 mole) and about 566 parts of diethylene triamine (5.5 moles) and a suitable quantity of toluol are introduced into a reaction vessel provided with a stirrer, a moisture trap and a reflux condenser. The reaction vessel is heated by an oil bath to an internal temperature of about 150° C. The amount of toluol in the reaction vessel is regulated either by removing it from the moisture trap or adding it through the reflux condenser until a vigorous refluxing action is obtained, without flooding, at about 150° C. Water is evolved in substantial quantities in the beginning of the reaction but the rate with which the water is evolved diminishes after about one-half of the total expected (about 72 parts) is collected. The reaction is continued until about 72 parts by weight of water are collected. This may require as long as 50-55 hours at 150° C. Near the end of the reaction it will be found that diethylene triamine is present in the water evolved in appreciable amounts which may be as high as about 50%. Due allowance must be made for the presence of diethylene triamine in the water collected in judging whether or not the reaction is substantially complete. For purposes of polymerization in accordance with the process of this invention it is not necessary that the reaction between the sebacic acid and the diethylene triamine be entirely complete. Thus, products in which, for example, the amount of water recovered is only about 90% of that which should theoretically be formed may be used in accordance with the process of this invention.

When the reaction between the sebacic acid and the diethylene triamine is substantially complete, the toluol and excess diethylene triamine are removed from the reaction product by distillation under reduced pressure. Since there was an approximately 3.5 molar excess of diethylene triamine in the original reaction mixture, about 370 parts of the amine may be recovered for reuse in the process.

If the reaction is carried out at temperatures from about 200-220° C. the time for completion of the reaction can be substantially lessened.

The reaction product produced by the procedure outlined above may be considered to have the following formula:

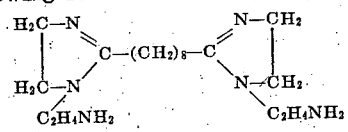

and may be called octamethylene bis-2-(1-aminoethylimidazoline).

*Example 2—Tetramethylene bis-2-(1-aminoethylimidazoline)*

This compound is made by reacting about 146 parts of adipic acid (1 mole) with about 566 parts of diethylene triamine (5.5 moles) by the same procedure as is set forth in Example 1. The final reaction product may be considered to have the formula

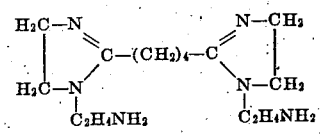

and may be called tetramethylene bis-2-(1-aminoethylimidazoline).

Example 3—Phenylene bis-2-(aminoethylamino-ethyl-1-aminoethylimidazoline)

Approximately 198 parts (1 mole) of dimethyl terephthalate and about 900 parts of tetraethylene pentamine (4¾ moles) are reacted in accordance with the procedure described in Example 1. As the reaction proceeds, methyl alcohol distills over first and thereafter water is also evolved. The reaction is complete when about 36 parts of water have been collected. Excess toluol and tetraethylene pentamine are removed from the final reaction product by vacuum distillation. It is not essential to remove the last traces of the tetraethylene pentamine since they will not interfere with the polymerization of the reaction product in accordance with the process of this invention.

The product produced by the procedure described has the formula

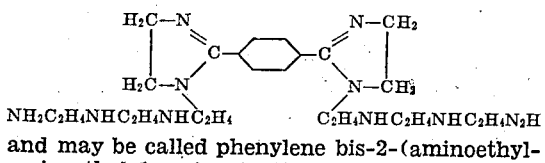

NH₂C₂H₄NHC₂H₄NHC₂H₄        C₂H₄NHC₂H₄NHC₂H₄N₂H and may be called phenylene bis-2-(aminoethyl-aminoethyl-1-aminoethylimidazoline).

In producing polymerization products from amino di-imidazolines such as those described in the foregoing example, it is advantageous to carry out the polymerization in the presence of inert solvents such as, for example, ethylene glycol or butyl cellosolve which aid in keeping the reaction mixture in a liquid state as the polymerization proceeds. Such inert solvents may also be used with advantage during the course of the acylation and subsequent polymerization of the amino di-imidazoline in accordance with the process of this invention.

The preparation of the new polymerized amino di-imidazolines and the new polymerized acylated amino di-imidazolines in accordance with the process of this invention will be illustrated by the following examples, but the invention is not limited thereto.

Example 4—Polymerization product of octamethylene bis-2-(1-aminoethylimidazoline) with propylene dichloride About 336 parts (1 mole) of octamethylene bis-2-(1-aminoethylimidazoline), about 33 parts of ethylene glycol and about 33 parts of butyl "cellosolve," the butyl ether of ethylene glycol, are thoroughly mixed. About 37.6 parts (⅓ mole) of propylene dichloride are then added and the resulting mixture is placed in a reaction vessel provided with a reflux condenser, and suitable stirring means. Advantageously the reaction vessel is heated by means of an oil bath. The internal temperature of the reaction vessel is raised to about 145° C. and a vigorous reflux action occurs. After about two to three hours another 37.6 parts (⅓ mole) of propylene dichloride is added and the heating is continued for about the same period of time. Thereafter another 37.6 parts (⅓ mole) of propylene dichloride is added and the heating is continued for an additional two to three hours. At the end of that time a viscous, light-colored product is obtained which has not reacted with all of the propylene dichloride but is extensively polymerized. To remove the unreacted propylene dichloride the mixture may be subjected to distillation at reduced pressure, although care must be taken so that existing foaming will not interfere with the effective removal of the dichloride. The reaction product is a hydrochloride salt of the polymeric amino di-imidazoline. The reaction product may, if desired, be used for example in the fixing of dye stuffs to the action of water, even though it contains a small amount of unreacted propylene dichloride.

The reaction mixture just described becomes a solid on cooling to room temperature. To facilitate the dissolving of this compound it is advantageous instead of cooling it to room temperature to cool it to about 90° C. in the reaction vessel and then add hot water together with about 30 to 70% (based on the weight of the reaction mixture) of 70% acetic acid. A 12% solution of the reaction mixture treated in this manner is a foamy, thin, yellow-colored solution. If the amount of acetic acid contained therein is adjusted so that the product has a pH of about 4 to 6, such a product may be used with advantage in dye fixing.

Instead of using acetic acid in treating the reaction product other acids such as hydrochloric, lactic, formic or phthalic acid may be used. The acid treatment results in the neutralization of the unreacted amino groups of the polymerized di-imidazoline.

Example 5—Acylated and polymerized octamethylene bis-2-(1-aminoethylimidazoline)

About 336 parts (1 mole) of octamethylene bis-2-(1-aminoethylimidazoline), about 106 parts of cocoanut oil (½ mole, assuming that the cocoanut oil averages 100% trilaurin) and about 10 parts of butyl cellosolve are introduced into a reaction vessel provided with a stirrer and a reflux condenser. The reaction vessel is advantageously heated by means of an oil bath. The mixture is heated in the reaction vessel for about 8 hours with stirring at a temperature of about 150° C. At the end of this time the mixture is in the form of a clear solution which may be dissolved in 1% acetic acid with the formation of a clear solution. At the end of this period an additional 10 parts of butyl cellosolve and about 84 parts (¾ mole) of propylene dichloride are added. The resulting mixture is refluxed with stirring for an additional 8 hours at 150° C. As the reaction proceeds the mixture becomes lighter in color and increases in viscosity.

The final reaction product is in the form of a partial hydrochloride salt of the polymeric imidazoline derivative. Not all of the propylene dichloride used in producing the compound is reacted, but, as pointed out in connection with Example 4, this propylene dichloride may be retained in the reaction mixture without affecting the usefulness of the product.

To facilitate the formation of aqueous solutions of the reaction product it is advantageous to mix the reaction product with water and formic acid before it becomes too viscous (when it has cooled to below 100° C.). The exact amount of formic acid necessary to neutralize all free amino groups in the polymeric di-imidazoline can be calculated providing the extent of the reaction of the propylene dichloride with the imidazoline is known. However, a slight excess of formic acid in the product will merely lower the pH of the reaction mixture slightly, but will not interfere with the usefulness of the product.

Example 6—Polymerized phenylene bis-2-(aminoethylaminoethyl-1-aminoethylimidazoline)

About 470 parts (1 mole) of phenylene bis-2-(aminoethylaminoethyl - 1 - aminoethylimidazoline) and about 87 parts (⅘ mole) of ethyl carbonate are introduced into a reaction vessel provided with a reflux condenser, stirrer and an oil bath for heating. The mixture is heated for about 8 hours at 150° C. If the reaction mixture becomes too viscous, the addition of a suitable quantity of butyl cellosolve through the reflux condenser will serve to reduce the viscosity. At the end of the 8 hour heating period the reaction product is dissolved in water and acidified as described in Examples 4 and 5.

*Example 7—Polymerized phenylene bis-2-(aminoethylaminoethyl-1-aminoethylimidazoline)*

About 470 parts (1 mole) of the phenylene bis-2-(aminoethylaminoethyl-1 - aminoethylimidazoline) produced as described in Example 3 and about 101 parts (½ mole) of sebacic acid are introduced into a reaction vessel provided with a stirrer, moisture trap and reflux condenser. Toluol is added so that the reflux temperature of the mixture is about 180° C. The reaction is carried on for about 3 hours. At the end of this time about 18 parts of water will have been collected. The final reaction mixture is more waxy in character than those previously described and may be neutralized with 70% acetic acid, after distilling off the toluol under reduced pressure, to produce a concentrated neutralized material.

*Example 8—Polymerized tetramethylene bis-2-(1-aminoethylimidazoline)*

About 280 parts (1 mole) of tetramethylene bis-2-(1-aminoethylimidazoline) is melted with about 38 parts of butyl cellosolve. To this is then added about 83 parts (¾ mole) of methyl chloroacetate. The resulting mixture is introduced into a reaction vessel provided with a stirrer and reflux condenser and heated for about 8 hours at 150° C.

During the course of the reaction methyl alcohol is formed and this either remains behind in the reaction mixture or tends to escape through the condenser if the latter is at a sufficiently high temperature. The presence of methyl alcohol in the final reaction product does not impair its usefulness. Advantageously the reaction product is neutralized with sufficient lactic acid to reduce the pH to about 4.5.

*Example 9—Polymerized and acylated phenylene bis - 2 - (aminoethylaminoethyl - 1 - aminoethylimidazoline)*

About 470 parts of phenylene bis-2-(aminoethylaminoethyl - 1 - aminoethylimidazoline), about 50 parts of butyl cellosolve and about 90 parts (¾ mole) of propylene dichloride are introduced into a reaction vessel provided with a stirrer and a reflux condenser. The reaction mixture is heated at about 150° C. for about 8 hours, the mixture becoming more viscous and lighter in color as the reaction proceeds. At the end of this period about 102 parts (1 mole) of acetic anhydride are added. This will react with the secondary amino groups in the polymerized imidazoline and also neutralize the other amino groups in the compound. This neutralization proceeds with the evolution of heat and, therefore, the anhydrides should be added slowly with stirring, keeping the temperature below about 140° C. The final product may be diluted and treated with additional acid such as for example formic or phthalic acid if necessary to reduce the pH of a 10% solution to below about 5.5.

I claim:

1. The process of preparing polymeric amino di-imidazolines which comprises reacting a bifunctional condensing agent with a preformed amino di-imidazoline having the formula

in which R is a residue selected from the group consisting of aliphatic and aromatic residues, X is an imidazoline radical which is linked to R at the 2 position of the imidazoline radical and Y is a radical selected from the group consisting of alkyl amine and polyalkylene polyamine groups, Y being linked to the nitrogen in the 1-position of the imidazoline radical.

2. The process of preparing salts of polymeric amino di-imidazolines which comprises reacting a bifunctional condensing agent with a preformed amino di-imidazoline having the formula

in which R is a residue selected from the group consisting of aliphatic and aromatic residues, X is an imidazoline radical which is linked to R at the 2 position of the imidazoline radical and Y is a radical selected from the group consisting of alkyl amine and polyalkylene polyamine groups, Y being linked to the nitrogen in the 1-position of the imidazoline radical, and then acidifying the resulting product.

3. The process of preparing polymeric acylated amino di-imidazolines which comprises reacting a bifunctional condensing agent with an amino di-imidazoline having the formula

in which R is a residue selected from the group consisting of aliphatic and aromatic residues, X is an imidazoline radical which is linked to R at the 2 position of the imidazoline radical and Y is a radical selected from the group consisting of alkyl amine and polyalkylene polyamine groups, Y being linked to the nitrogen in the 1-position of the imidazoline radical, and then acylating the resulting product.

4. The process of preparing polymeric acylated amino di-imidazolines which comprises acylating an amino di-imidazoline having the formula

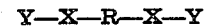

in which R is a residue selected from the group consisting of aliphatic and aromatic residues, X is an imidazoline radical which is linked to R at the 2 position of the imidazoline radical and Y is a radical selected from the group consisting of alkyl amine and polyalkylene polyamine groups, Y being linked to the nitrogen in the 1-position of the imidazoline radical, the extent of the acylation being such that the acylated product has at least one unacylated amino group in one of the radicals Y and then reacting the resulting product with a bifunctional condensing agent.

5. The process of preparing polymeric amino di-imidazolines which comprises reacting a bifunctional condensing agent with a preformed amino di-imidazoline having the formula $$H(HN-Z)_p-X-R-X-(Z-NH)_pH$$

in which R is a residue selected from the group consisting of aliphatic and aromatic residues, X is an imidazoline radical which is linked to R at the 2 position of the imidazoline radical, Z is a radical selected from the group consisting of ethylene and propylene groups and $p$ is an integer from 1 to 4, the (Z—NH) group being linked to the nitrogen in the 1-position of the imidazoline radical.

6. The process of preparing salts of polymeric acylated amino di-imidazolines which comprises reacting an alkylene dihalide with an amino di-imidazoline having the formula

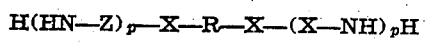
H(HN—Z)$_p$—X—R—X—(X—NH)$_p$H in which R is a residue selected from the group consisting of aliphatic and aromatic residues, X is an imidazoline radical which is linked to R at the 2 position of the imidazoline radical, Z is a radical selected from the group consisting of ethylene and propylene groups and $p$ is an integer from 1 to 4, the (Z—NH) group being linked to the nitrogen in the 1-position of the imidazoline radical, and acylating the resulting product.

7. The process of preparing salts of polymeric acylated amino di-imidazolines which comprises acylating an amino di-imidazoline having the formula

H(HN—Z)$_p$—X—R—X—(Z—NH)$_p$H in which R is a residue selected from the group consisting of aliphatic and aromatic residues, X is an imidazoline radical which is linked to R at the 2 position of the imidazoline radical, Z is a radical selected from the group consisting of ethylene and propylene groups and $p$ is an integer from 1 to 4, the (Z—NH) group being linked to the nitrogen in the 1-position of the imidazoline radical, the extent of the acylation being such that the acylated product has at least one unacylated amino group in one of the radicals (Z—NH) and reacting the resulting product with an alkylene dihalide.

8. The process of preparing polymeric amino di-imidazolines which comprises reacting a bifunctional condensing agent with octamethylene bis-2-(1-aminoethylimidazoline).

9. The process of preparing polymeric amino di-imidazolines which comprises reacting a bifunctional condensing agent with tetramethylene bis-2-(1-aminoethylimidazoline).

10. The process of preparing salts of polymeric amino di-imidazolines which comprises reacting octamethylene bis-2-(1-aminoethylimidazoline) with an alkylene dihalide in which the alkylene group contains on more than three carbons.

11. The process of preparing salts of polymeric amino di-imidazolines which comprises reacting tetramethylene bis-2-(1-aminoethylimidazolines) with an alkylene dihalide in which the alkylene group contains no more than three carbons.

12. New polymeric products produced by the process defined in claim 1.

13. New polymeric products produced by the process defined in claim 3.

14. New polymeric products produced by the process defined in claim 5.

15. New polymeric products produced by the process defined in claim 6.

16. New polymeric products produced by the process defined in claim 7.

17. New polymeric products produced by the process defined in claim 8.

SAUL KAPLAN.